United States Patent
Leiserson et al.

(10) Patent No.: US 9,563,729 B2
(45) Date of Patent: Feb. 7, 2017

(54) SIGNAL TRANSITION ANALYSIS OF A CIRCUIT

(71) Applicant: CRYPTOGRAPHY RESEARCH, INC., Sunnyvale, CA (US)

(72) Inventors: Andrew John Leiserson, San Francisco, CA (US); Megan Anneke Wachs, San Francisco, CA (US)

(73) Assignee: CRYPTOGRAPHY RESEARCH, INC., Sunnyvale, CA (US)

( * ) Notice: Subject to any disclaimer, the term of this patent is extended or adjusted under 35 U.S.C. 154(b) by 0 days.

(21) Appl. No.: 14/896,901

(22) PCT Filed: Jun. 20, 2014

(86) PCT No.: PCT/US2014/043447
§ 371 (c)(1),
(2) Date: Dec. 8, 2015

(87) PCT Pub. No.: WO2014/205369
PCT Pub. Date: Dec. 24, 2014

(65) Prior Publication Data
US 2016/0133341 A1 May 12, 2016

Related U.S. Application Data

(60) Provisional application No. 61/838,195, filed on Jun. 21, 2013.

(51) Int. Cl.
*H04L 9/00* (2006.01)
*G06F 17/50* (2006.01)
(Continued)

(52) U.S. Cl.
CPC .......... *G06F 17/5036* (2013.01); *G01R 27/02* (2013.01); *G06F 17/50* (2013.01); *G11C 29/50* (2013.01); *H04L 9/003* (2013.01)

(58) Field of Classification Search
USPC ...... 380/44, 28, 29, 42, 43; 714/37, E11.142
See application file for complete search history.

(56) References Cited

U.S. PATENT DOCUMENTS 6,940,975 B1* 9/2005 Kawamura ............. H04L 9/003
380/29
2007/0219735 A1 9/2007 Saeki
(Continued)

FOREIGN PATENT DOCUMENTS

WO 2014205398 A1 12/2014

OTHER PUBLICATIONS

International Search Report and Written Opinion, Corrected, Application No. PCT/US2014/043447, mailed Oct. 16, 2014.
(Continued)

*Primary Examiner* — Vu Le
(74) *Attorney, Agent, or Firm* — Lowenstein Sandler LLP

(57) ABSTRACT

A first signal and a second signal associated with a circuit may be identified. A first count of a number of times that the second signal is associated with a transition when the first signal is at a first value may be determined. Furthermore, a second count of a number of times that the second signal is associated with a transition when the first signal is at a second value may be determined. A value corresponding to the dependence between the second signal and the first signal may be calculated based on the first count and the second count.

20 Claims, 9 Drawing Sheets

(51) Int. Cl.
*G01R 27/02* (2006.01)
*G11C 29/50* (2006.01)

(56) References Cited

U.S. PATENT DOCUMENTS

| | | |
|---|---|---|
| 2008/0221854 A1 | 9/2008 | Arimoto |
| 2009/0006012 A1 | 1/2009 | Kawabe |
| 2009/0323942 A1* | 12/2009 | Sharon .................. G11C 7/1006 |
| | | 380/44 |
| 2010/0057429 A1 | 3/2010 | Srinivasan |
| 2010/0091982 A1 | 4/2010 | Kocher et al. |
| 2010/0153744 A1 | 6/2010 | Nobukata |
| 2010/0246808 A1 | 9/2010 | Hisakado |
| 2013/0129083 A1 | 5/2013 | Fujino |
| 2014/0115398 A1* | 4/2014 | Pnueli ..................... G06F 11/14 |
| | | 714/37 |

OTHER PUBLICATIONS

Suzuki et al. 'DPA Leakage Models for CMOS Logic Circuits'. In Cryptographic Hardware and Embedded Systems CHES Dec. 2005, pp. 366-382. Springer Berlin Heidelberg, 2005.
Mulder et al. 'Practical DPA Attacks on MDPL'. Cryptology ePrint Archive: Report 2009/231 [online], Dec. 2009 [retrieved on Dec. 3, 2015 from eprint.iacr.org/2009/231.pdf].
International Search Report and Written Opinion, Application No. PCT/US2014/043493, mailed Oct. 15, 2014.

\* cited by examiner

SIGNAL TRANSITION ANALYSIS OF A CIRCUIT

RELATED APPLICATION

This application claims the benefit of U.S. Provisional Application No. 61/838,195, filed on Jun. 21, 2013, which is incorporated by reference.

BRIEF DESCRIPTION OF THE DRAWINGS

The present disclosure will be understood more fully from the detailed description given below and from the accompanying drawings of various implementations of the disclosure.

DETAILED DESCRIPTION

Figure 1:
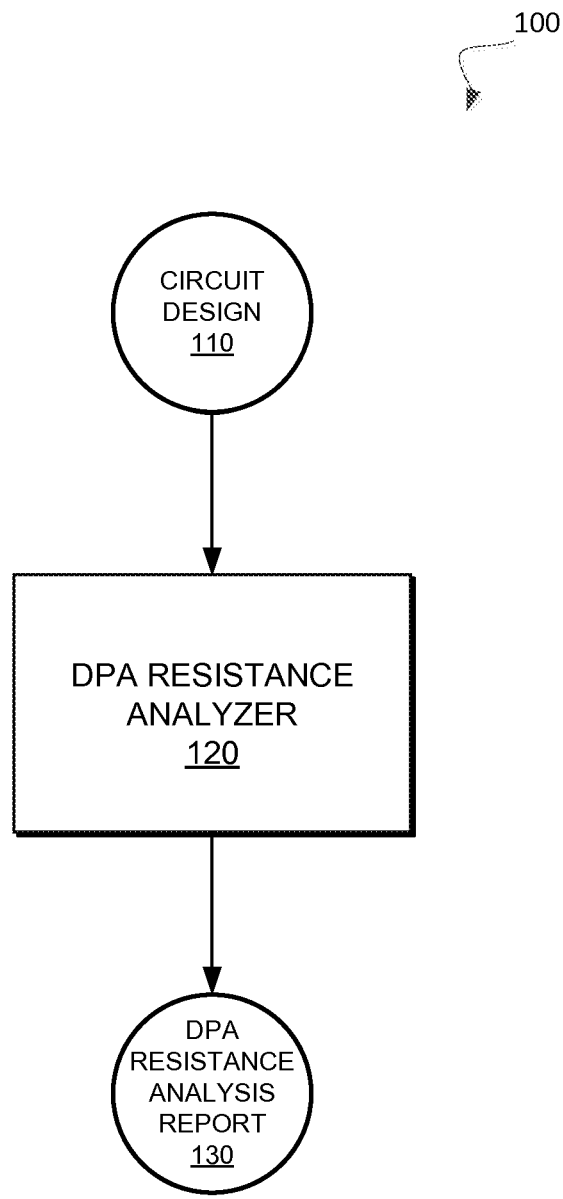
FIG. 1 illustrates an example environment to analyze a circuit based on differential power analysis (DPA) resistance in accordance with some embodiments.

The present disclosure is directed to an analysis of signal transitions of a circuit. In some embodiments, a circuit design corresponding to a circuit may be simulated and transitions of the signals of the circuit may thus be observed and analyzed. For example, the simulation of the circuit may involve providing a varying input (i.e., a stimulus) to the circuit and observing the response of the signals of the circuit to the varying input. The signals of the circuit may transition from a first logical state (e.g., a value of '0') to a second logical state (e.g., a value of '1') or may transition from the second logical state to the first logical state. Such transitions of the signals may be referred to as a rising transition and a falling transition, respectively. Thus, a change in the input to the circuit (e.g., a varying stimulus) may result in multiple rising transitions and falling transitions of the signals of the circuit. The repeated rising transitions and falling transitions of a signal may be referred to as toggling or switching.

The analysis during simulation of such transitions of the signals of the circuit may provide information as to whether the circuit is susceptible to a side channel attack. An example of a side channel attack includes, but is not limited to, Differential Power Analysis (DPA) where an attacker who seeks to obtain information from the circuit may study the power consumption of the circuit. For example, the circuit may be a cryptographic hardware circuit that may be used to generate a cryptographic key or other such secret information. An attacker may be an unauthorized entity who may obtain a cryptographic key or other secret data from the cryptographic hardware circuit by analyzing the power consumption measurements of the cryptographic hardware circuit over a period of time.

There may be a statistical dependence between observable variations associated with the signals of the cryptographic hardware circuit (e.g. electrical activity) and secret data associated with the operation of the cryptographic hardware circuit. The transitions of the signals of the cryptographic hardware circuit may consume power and such power consumption from the rising transitions and falling transitions of the signals may make the cryptographic hardware circuit susceptible to a DPA attack. For example, a DPA attack may employ statistical techniques to extract the cryptographic key from power consumption measurements of the signals of the cryptographic hardware circuit. An analysis of the signals of a circuit design corresponding to a cryptographic hardware circuit may be used to identify signals of the circuit design that are susceptible to a DPA attack to be able to take countermeasures to ensure that the cryptographic hardware circuit is not susceptible to the DPA attack. For example, the countermeasures may cause dependence between secret data and observable variations associated with the signals of the cryptographic hardware circuit to be minimized or reduced.

According to aspects of the present disclosure, the transitions of the signals of the circuit design may be simulated, observed, and recorded. Such observed or recorded signals of the cryptographic hardware circuit may be referred to as internal signals (e.g., signals relating to the operation of the cryptographic hardware circuit). Furthermore, a selector signal associated with the circuit may be identified. The selector signal may, for example, be an input, output, or other signal of the cryptographic hardware circuit. The selector signal may also be computed as a function of signals of the cryptographic hardware circuit, but not appear within the circuit. The selector signal may be chosen to correspond with some value that is desired not to be susceptible to a DPA attack, for example, a secret data value. The transitions of the internal signals may be analyzed relative to a logical state of the selector signal. For example, a number of times a transition of the internal signal occurs during a time period when the selector signal is at either a first logical state or a second logical state may indicate a degree of dependence between the internal signal and the selector signal. An internal signal having a high degree of dependence with the selector signal may be considered as indicative of a potential or possible DPA leak since an attacker may observe the power variations resulting from the transitions of the internal signal in order to gain information about the selector signal. The information gained in a DPA attack may or may not constitute complete knowledge about the value of the selector signal (i.e., the attacker may learn that the selector is more likely to have a value of '1' than a value of '0').

A side channel attack (e.g. a DPA attack) may perform statistical analysis to examine the aggregate behavior of a cryptographic hardware circuit across many operations. The attack may, for example, capture a measurement trace (e.g. supply current over time) for each operation, classify the traces into groups, and compute the overall average trace associated with each group. A time interval or time period associated with each trace may correspond with the operation of the cryptographic circuit. For example, the start of each trace may correspond to the input of a plaintext to the cryptographic circuit, and the duration of the trace may correspond to the time used by the cryptographic circuit to encrypt that plaintext. In some embodiments, transitions of signals in the cryptographic circuit are interpreted with respect to the interval of time associated with the traces that may be used for a side channel attack. When counting the number of transitions of a signal, the count may be restricted to a certain time interval or time period. For example, a first counter may count the number of transitions occurring at least 1.000 nanoseconds (ns) and at most 1.005 nanoseconds after the input of the plaintext, and a second counter may count the number of transitions occurring at least 1.005 ns and at most 1.010 ns after the input of the plaintext.

Aspects of the present disclosure identify such potential DPA leaks associated with signals of the circuit. For example, the number of times that the specific internal signal is associated with a transition (e.g., a rising transition or a falling transition or either type of transition) at times when the selector signal is at a particular logical state may be recorded. For example, a number of times that the specific internal signal is associated with a transition while the selector signal is at a logical state of '0' and a number of times that the same internal signal does not transition while the selector signal is at a logical state of '0' may be recorded. Additionally, a number of times that the same internal signal is associated with a transition while the selector signal is at a logical state of '1' and a number of times that the same internal signal does not transition while the selector signal is at the logical state of '1' may be recorded.

Thus, four transition counts for an internal signal relative to a selector signal may be identified. If the dependence between secret data and variations of the internal signal is to be minimized or reduced in order to ensure that the cryptographic hardware circuit is not susceptible to a DPA attack (e.g., the internal signal is not a DPA leak), then the transition counts of the internal signal when the selector signal is at the logical state of '0' and when the selector signal is at the logical state of '1' should be made similar in quantity, so that observation of the internal signal does not provide information about the value of the selector signal. In some embodiments, expected transition counts of the internal signal may be calculated based on the observed transition counts of the internal signal. A calculation based on the observed transition counts and the expected transition counts of the internal signal relative to the selector signal may be used to determine if the internal signal is not sufficiently independent from the selector signal (e.g., the internal signal is indicative of a potential DPA leak as the transitions of the internal signal may have too great a dependence with the selector signal).

Thus, aspects of the present disclosure perform an analysis of internal signals of a circuit relative to a selector signal of the circuit in order to provide information regarding the independence or degree of dependence between the internal signals and the selector signal. Based on this information, internal signals having a high degree of dependence with the selector signal may be reported as a cause for concern since such internal signals may make a cryptographic hardware circuit more susceptible to a DPA attack as opposed to an internal signal having a lower degree of dependence with the selector signal. For example, an internal signal having a lower degree of dependence with the selector signal may result in the power measurements in the DPA attack not providing useful information that an attacker of the circuit may use to reconstruct secret data (e.g., a portion or the entirety of a cryptographic key), even though those power measurements do provide information about the transitions of the internal signal.

FIG. 1 illustrates an example environment 100 to analyze a circuit design for DPA resistance. In general, the example environment 100 illustrates the analysis of a circuit design corresponding to a circuit to generate a report based on the analysis of the circuit design for DPA resistance. The analysis for DPA resistance may refer to an analysis of the degree of dependence between an internal signal of the circuit design and a selector signal of the circuit design (e.g., an analysis as to whether an internal signal is associated with a leak).

As shown in FIG. 1, the example environment 100 includes a circuit design 110 (e.g., a circuit design file) that may represent a circuit. In some embodiments, the circuit design 110 may be a register-transfer level (RTL) representation of the circuit. However, in alternative embodiments, other representations of the circuit may be used. Thus, the circuit design 110 may be a design file that corresponds to a representation of a circuit. The environment 100 may further include a differential power analysis (DPA) resistance analyzer 120. Further details with regard to the DPA resistance analyzer are described with regard to FIGS. 2-8. The DPA resistance analyzer 120 may receive the circuit design 110 and may analyze the circuit design 110 to produce a DPA resistance analysis report 130. In some embodiments, the DPA resistance analysis report 130 may provide information identifying signals of the circuit design 110 that may be susceptible to a DPA attack (e.g., an internal signal having a high degree of dependence with a selector signal). Alternatively or in addition, the DPA resistance analysis report 130 may provide information to indicate portions (e.g., internal signals) of the circuit corresponding to the circuit design 110 that are less resistant to a DPA attack than other portions of the circuit that may be more resistant to a DPA attack. Further details with regard to the DPA resistance analysis report 130 are described with regard to FIG. 6.

Figure 2:
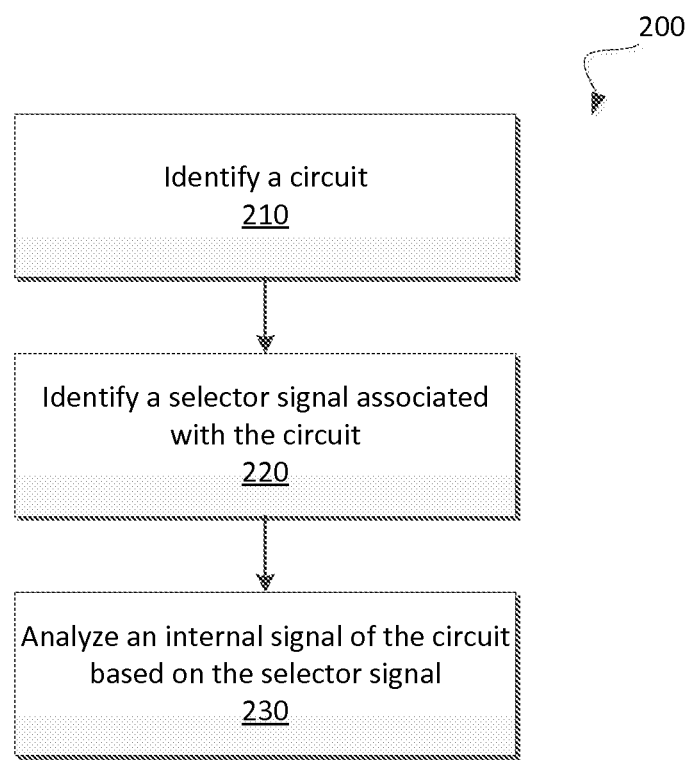
FIG. 2 is a flow diagram of an example method to analyze a signal of a circuit in accordance with some embodiments of the present disclosure.

FIG. 2 is a flow diagram of an example method 200 to analyze an internal signal of a circuit design. In general, the method 200 may be performed by processing logic that may comprise hardware (e.g., processing device, circuitry, dedicated logic, programmable logic, microcode, hardware of a device, etc.), software (e.g., instructions run or executed on a processing device), or a combination thereof. In some embodiments, the method 200 may be performed by the DPA resistance analyzer 120 of FIG. 1.

As shown in FIG. 2, the method 200 may begin with the processing logic identifying a circuit (block 210). For example, a circuit or a portion of a circuit from a circuit design may be identified. For example, the circuit or the portion of the circuit may be identified based on a user input. In some embodiments, the circuit or the portion of the circuit may be identified from a circuit design file (e.g., circuit design 110). In the same or alternative embodiments, the identified portion of the circuit design may correspond to a cryptographic function or operation of the circuit design or the circuit design may correspond to a cryptographic circuit. A cryptographic circuit may be a circuit that performs a cryptography operation or function such as, but not limited to, the generation of a key to be used by the circuit or another to perform authorized or authenticated operations, or the encipherment or decipherment of data using a secret key. The processing logic may further identify a selector signal associated with the circuit (block 220). For example, the selector signal may be identified based on a user input. In some embodiments, one or more signals of the circuit design or a function thereof may be identified to be a selector signal. For example, an input to a portion of the circuit design that corresponds to a cryptographic operation or function may be identified as a selector signal. The processing logic may further analyze an internal signal of the circuit design based on the identified selector signal (block 230). An internal signal may be any signal in the identified portion of the circuit design, other than the selector signal(s). For example, internal signals of the circuit design or portions of the circuit design that correspond to a cryptographic operation or function may be analyzed based on the selector signal. Furthermore, the selector signal may be based on a combination of multiple signals in the design (e.g., an XOR logical function of signals in the circuit design). Additionally, the selector signal may be based on a combination of multiple signals of the circuit design relative to different time points. For example, the selector signal may be based on a first signal that occurs at a first time and a second signal that occurs at a second time that is after the first time. In alternative embodiments, the selector signal may be based on a value that is not based on a signal of the circuit design (e.g., an unmasked version of a component that is masked in hardware). In some embodiments, the value of the selector signal may be sampled at some particular offset relative to the time interval or time period, and that sampled value may be used as the value of the selector signal for all transitions occurring during the time interval or time period. In some embodiments, the transitions (and times when the internal signal does not transition) of the internal signals relative to the selector signal may be identified and counted. Furthermore, an analysis of the transitions of the internal signals may include an expected number of transitions and a determination if the internal signal is associated with a DPA leak.

Thus, a circuit design or a portion of a circuit design that corresponds to a cryptographic operation or function may be identified. A selector signal associated with the circuit design or portion of the circuit design may also be identified. An analysis of internal signals of the circuit design or the portion of the circuit design may be provided based on the identified selector signal.

Figure 3:
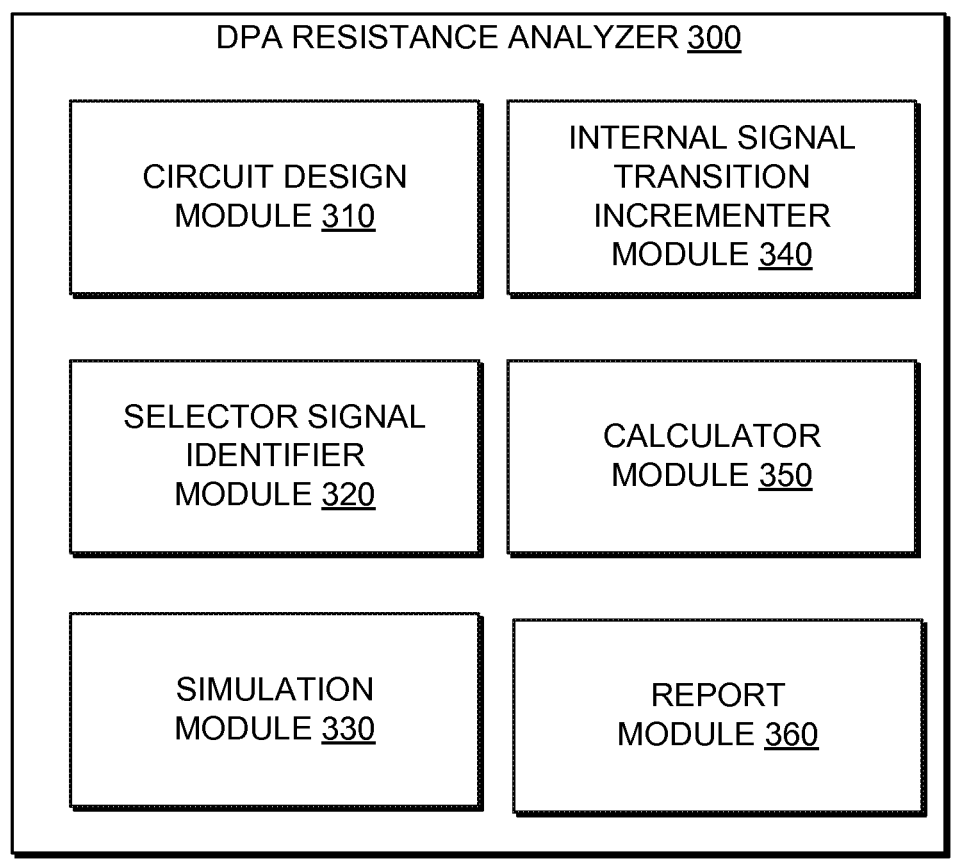
FIG. 3 is a block diagram of an example DPA resistance analyzer in accordance with some embodiments of the present disclosure.

FIG. 3 is a block diagram of a DPA resistance analyzer 300. In general, the DPA resistance analyzer 300 may correspond to the DPA resistance analyzer 120 of FIG. 1. The DPA resistance analyzer 300 may include a circuit design module 310, a selector signal identifier module 320, a simulation module 330, an internal signal transition incrementer module 340, a calculator module 350, and a report module 360. In alternative embodiments, the functionality of one or more of the modules may be combined or divided.

The circuit design module 310 may identify or receive a circuit design. For example, the circuit design module 310 may receive a circuit design file (e.g., circuit design 110) and may further identify a portion of the circuit design file that may correspond to a cryptographic operation or function.

The selector signal identifier module 320 may identify one or more signals of the circuit design that are to be used as a selector signal. For example, an input to a portion of the circuit design may be selected as a selector signal. In alternative embodiments, multiple selector signals may be selected.

The simulation module 330 may obtain data or statistics of the circuit design or the portion of the circuit design as a simulation of the circuit design or the portion of the circuit design is run. The data or statistics of the circuit design may include, but is not limited to, transitions and logical levels of signals associated with the circuit design or the portion of the circuit design and times of each of the transitions Thus, the simulation module 330 may record the data of the circuit design associated with transitions of signals and logical levels of signals while the simulation of the circuit design is being run. The simulation module 330 may obtain the data or statistics by instrumenting the simulation, for example, by employing the Verilog Procedural Interface (VPI).

The internal signal transition incrementer module 340 may increment transition counts associated with internal signals of the circuit design or the portion of the circuit design. For example, a number of times that each internal signal is associated with a rising transition during a given time period and a number of times that each signal is associated with a falling transition during the same given time period while the selector signal is at a first value may be counted and a number of times that each of the internal signals is associated with a rising transition and a number of times that each of the internal signals is associated with a falling transition while the selector signal is at a second value that is different than the first value may be counted. For another example, a number of times that each internal signal is associated with a transition (e.g., a rising transition, a falling transition, or either of a rising transition or a falling transition) during a given time period and a number of times that each signal is associated with no transition (e.g., the value of the internal signal remains the same) during the same time period while the selector signal is at a first value may be counted and a number of times that each of the internal signals is associated with a transition during the same time period and a number of times that each of the internal signals is associated with no transition during the same time period while the selector signal is at a second value that is different than the first value may be counted. Thus, the internal signal transition incrementer module 340 may record observed internal signal transitions relative to values or logical states of the selector signal. Additionally, the internal signal transition incrementer module 340 may increment transition counts and no transition counts for a given time period associated with the internal signals based on when the internal signal is associated with a transition (e.g., either a rising transition or a falling transition) and when the internal signal is not associated with a transition when the selector signal is at a first value and when the selector signal is at a second value.

The calculator sub-module 350 may calculate or generate expected counts of signal transitions of the simulated circuit design. For example, the calculator sub-module 350 may calculate an expected number of transitions of the internal signals relative to the values or logical states of the selector signal. The calculator sub-module 350 may calculate an expected number of times that each internal signal is associated with a rising transition and an expected number of times that each of the internal signals is associated with a falling transition while the selector signal is at a first value and while the selector signal is at a second value. In alternative embodiments, the calculator sub-module 350 may calculate an expected number of transitions (e.g., rising transitions or both rising transitions and falling transitions) while the selector signal is at the first value and while the selector signal is at the second value. The calculator sub-module 350 may calculate the expected number of times that an internal signal is associated with a rising transition while the selector signal is at a first value by multiplying the number of times an internal signal is associated with a rising transition (without regard to the value of the selector signal) by the number of times the selector is at a first value (without regard to whether the internal signal is associated with a rising transition), then dividing by the total number of observations made.

In some embodiments, the calculator sub-module 350 may further calculate a distribution number that is based on the observed transitions and expected transitions of each of the internal signals. The distribution number may be used to determine if the difference between the observed transitions of the internal signal and the expected transitions of the internal signal may be due to chance rather than a dependence between the internal signal and the selector signal. In some embodiments, the distribution number may be calculated as $$\sum \frac{(O-E)^2}{E},$$

where O is the number of times an internal signal is associated with a transition, E is the expected number of times the internal signal is associated with a transition, and the sum is taken over one or more transition types (e.g. rising or falling transitions) and/or one or more selector signal values. In some embodiments, the distribution number may be compared to a chi-square or $\chi^2$-distribution. Comparison of the distribution number to the chi-square distribution may serve to evaluate whether the observed number of times an internal signal is associated with a transition is indicative of a potential DPA leak. The comparison of the distribution number to the chi-square distribution may be performed, for example, by selecting a value from the chi-square distribution corresponding to a chosen significance level, for example, the 5% significance level. If the distribution number is larger than the value of the chi-square distribution corresponding to the chosen significance level, then the activity of the internal signal (e.g. rising or falling transitions) may be a DPA leak. In some embodiments, the significance level may be chosen to be low (e.g. 0.1% or 0.01%) to reduce the likelihood of reporting a false positive. A false positive may refer to reporting a dependence between the internal signal and the selector signal when no such dependence exists (i.e., reporting that the internal signal may be a DPA leak when no such leak exists). The report module 360 may generate a DPA resistance analysis report for the circuit design or the portion of the circuit design. For example, the report module 360 may generate a report that identifies the observed transitions of internal signals, the expected transitions and times when a transition is not expected of the internal signals, and an indication as to whether particular internal signals do not satisfy a requirement or condition (e.g., do not satisfy the condition that the distribution number falls below the 5% significance level on the chi-square distribution) and are thus considered a leak and susceptible to a DPA attack.

Figure 4:
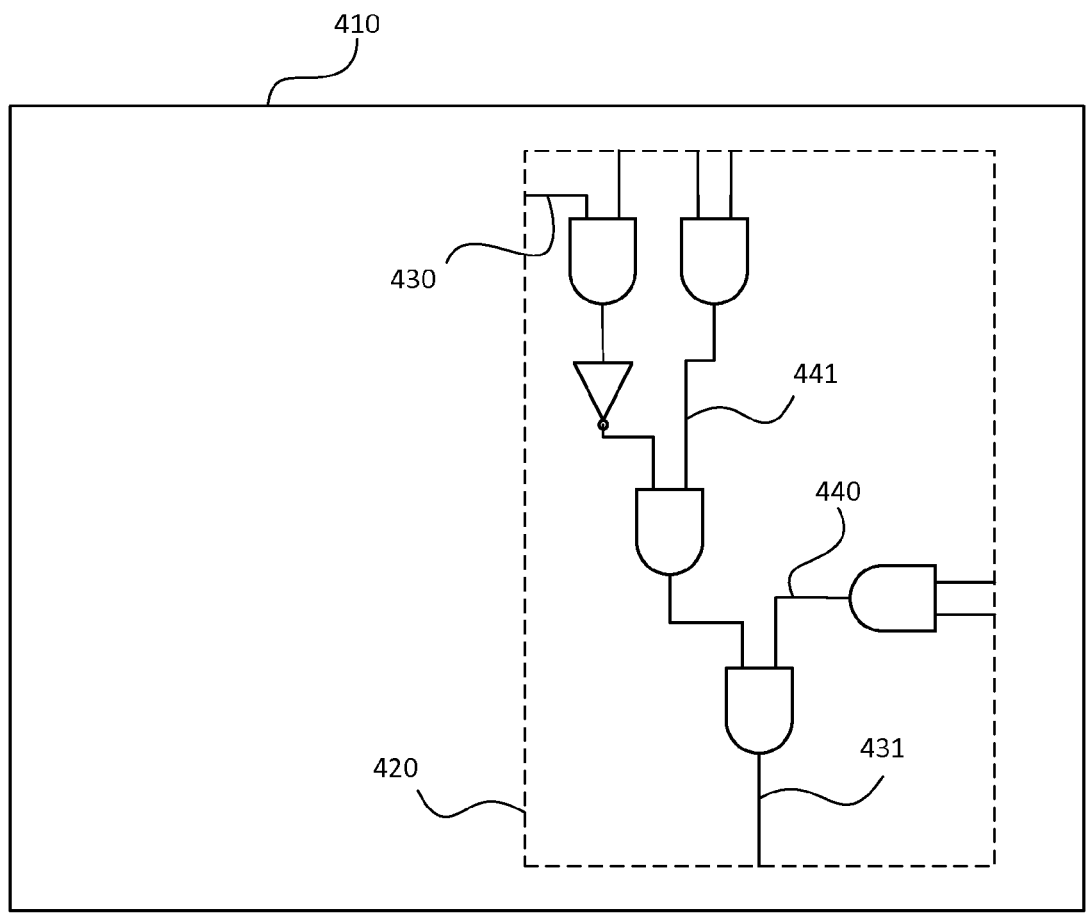
FIG. 4 is a block diagram of an example circuit design in accordance with some embodiments.

FIG. 4 is a block diagram of an example circuit design 410. In some embodiments, the circuit design 410 may correspond to the circuit design 110 of FIG. 1. The sample circuit design 410 includes a portion 420 that may perform a cryptographic operation or function.

As shown in FIG. 4, the portion 420 of the circuit design 410 may include selector signals 430 and 431 and internal signals 441 and 440. The selector signals 430 and 431 are illustrated as interfaces (e.g., an input signal and an output signal) to the portion 420 of the circuit 410, however any signal of the portion 420 may be used as a selector signal. Furthermore, the portion 420 of the circuit design 410 may include internal signals 440 and 441. The internal signals 440 and 441 may be signals used in the cryptographic operation or function of the portion 420 of the circuit design 410.

In some embodiments, a DPA resistance analyzer (e.g., DPA resistance analyzer 120 of FIG. 1 and/or DPA resistance analyzer 300 of FIG. 3) may be used to identify the selector signals 430 and/or 431. For example, a specific signal associated with the portion 420 of the circuit design 410 may be identified to be used as a selector signal. The selector signal may be specified based on user input. In some embodiments, multiple signals may be identified to be used as a selector signal. For example, a combination of the selector signal 430 and the selector signal 431 may be used as a selector signal. In some embodiments, the DPA resistance analyzer may analyze the transitions of the internal signals 440 and 441 relative to a selector signal. For example, if the selector signal 430 is identified as the selector signal to be used by the DPA resistance analyzer, then the DPA resistance analyzer may identify a number of transitions of the internal signal 440 and a number of transitions of the internal signal 441 relative to a first value and a second value of the selector signal 430.

Figure 5:
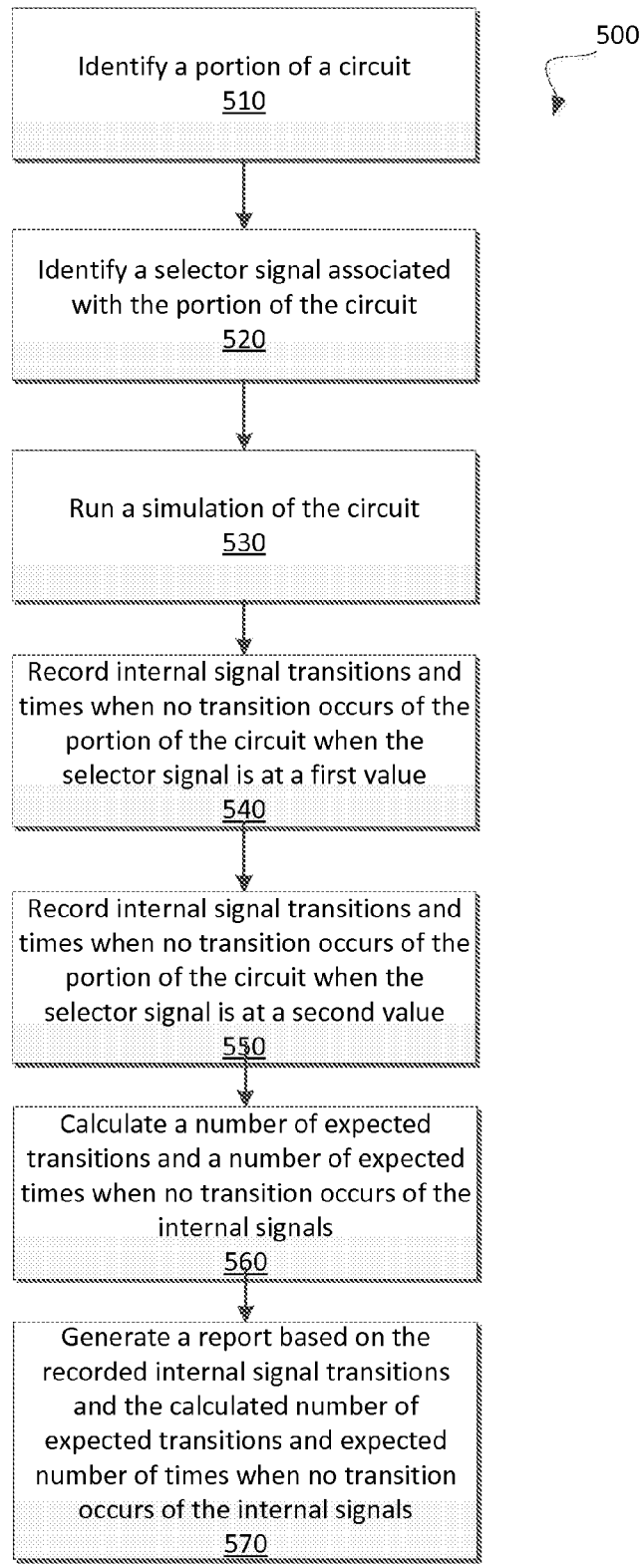
FIG. 5 is a flow diagram of an example method to generate a report based on signal transitions in accordance with some embodiments of the disclosure.

FIG. 5 is a flow diagram of a method 500 to generate a report based on signal transitions. In general, the method 500 may record observed transitions of internal signals of a circuit design, calculate expected transitions of the internal signals of the circuit design, and generate a report based on the observed transitions and the expected transitions of the internal signals. The method 500 may be performed by processing logic that may comprise hardware (e.g., processing device, circuitry, dedicated logic, programmable logic, microcode, hardware of a device, etc.), software (e.g., instructions run or executed on a processing device), or a combination thereof. In some embodiments, the method 500 may be performed by the DPA resistance analyzer 120 of FIG. 1 or the DPA resistance analyzer 300 of FIG. 3.

As shown in FIG. 5, the method 500 may begin with the processing logic identifying a portion of a circuit (block 510). For example, a portion of the circuit from a circuit design may be identified. In some embodiments, the identified portion of the circuit may correspond to cryptographic operations or functions of the circuit. The processing logic may further identify a selector signal associated with the portion of the circuit (block 520). For example, an input signal to the portion of the circuit may be identified or selected as a selector signal. In some embodiments, multiple signals may be identified as a selector signal. For example, a selector signal may be multiple bits where a first bit of the selector signal is from a first signal (e.g., a first input signal to the portion of the circuit) and a second bit of the selector signal is from a second signal (e.g., a second input signal to the portion of the circuit). Thus, in some embodiments, a combination of signals may be identified as the selector signal. The processing logic may run a simulation of the circuit (block 530). In some embodiments, the simulation of the circuit may involve using mathematical models or constructs to replicate the behavior of an actual circuit that is implemented in hardware or through circuitry. For example, a circuit design file that corresponds to a circuit may be simulated in order to replicate and observe the actual behavior of the circuit.

The method 500 may further record internal signal transitions and times when no transition occurs of the portion of the circuit when the selector signal is at a first value (block 540). For example, transitions of each internal signal when the selector signal is identified at a first value may be recorded and a transition count and a no transition count for each internal signal relative to the selector signal at the first value may be incremented. Furthermore, internal signal transitions and times when no transition occurs of the portion of the circuit design when the selector signal is at a second value may be recorded (block 550). For example, the transitions of each internal signal when the selector signal is identified at the second value may be recorded and a second transition count and a second no transition count for each internal signal relative to the selector signal at the second value may be incremented in response to each transition of the internal signal or each time that the internal signal is not associated with a transition.

As shown in FIG. 5, the method 500 may further calculate a number of expected transitions of the internal signal and an expected number of times that the internal signal is not associated with a transition (e.g., a no transition) (block 560). In some embodiments, the number of expected transitions of the internal signals may include an expected number of transitions when the selector signal is at a first value and the expected number and an expected number of times that the internal signal is not associated with a transition when the selector signal is at a first value and an expected number of transitions and an expected number of times that the internal signal is not associated with a transition when the selector signal is at a second value. The calculated expected number of transitions of the internal signals may be based on the observed transitions of the internal signals. In some embodiments, the calculated expected number of transitions of the internal signals may be based on a chi-squared distribution with one degree of freedom in the distribution as previously described with regard to FIG. 3. Furthermore, a chi squared value is determined based on the observed transitions of the internal signals and the expected transitions of the internal signals. For example, a high chi-squared value may be calculated if the observed transitions of an internal signal significantly vary from the expected transitions of the internal signals. Thus, a high chi-squared value may indicate a low degree of independence between the input signal and the selector signal.

The method 500 may further generate a report (e.g., DPA analysis report 130) based on the recorded internal signal transitions and the calculated number of expected transitions of the internal signals (block 570). Further details with regard to the report are disclosed with regard to FIGS. 6-8.

Thus, a portion of a circuit design may be identified. The portion may correspond to a cryptographic operation or function of the circuit design. An input signal to the portion of the circuit design may be identified as a selector signal. A simulation of a design file corresponding to the circuit design may be run. Transitions of the internal signals and times when the internal signals do not transition may be recorded at times when the selector signal is at a first value (e.g., a '0') and when the selector signal is at a second value (e.g., a '1'). A chi-squared value may be calculated for each internal signal based on the observed transitions and the expected transitions for the internal signal.

Figure 6:
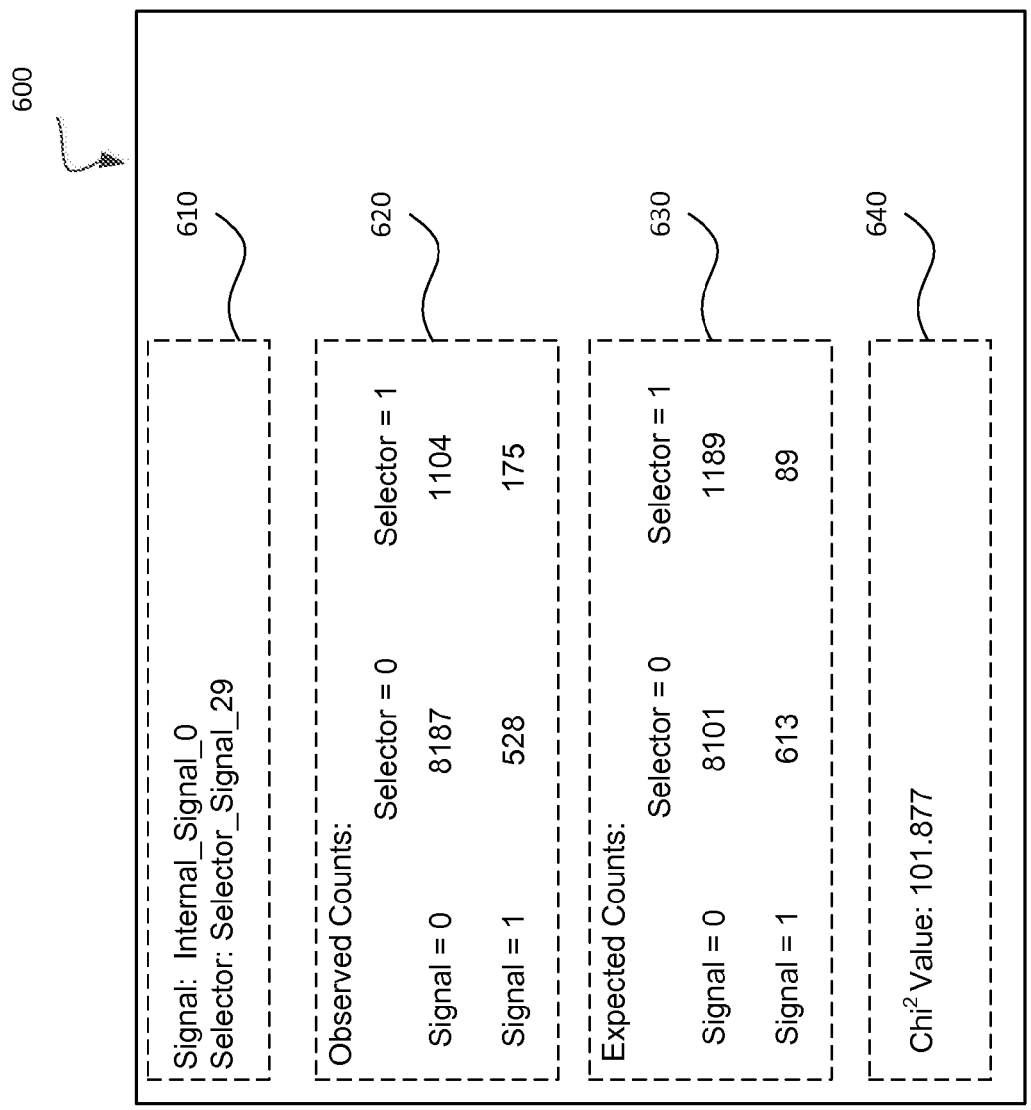
FIG. 6 is a block diagram of an example report to provide information associated with a DPA resistance analysis of a signal of a circuit in accordance with some embodiments.

FIG. 6 is a block diagram of a report 600 to provide information associated with a signal of a circuit. In general, the report 600 may correspond to the DPA resistance analysis report 130 of FIG. 1 and/or the report generated at block 570 of FIG. 5. The report 600 may provide an analysis of an internal signal of a portion of a circuit design (e.g., portion 420 of the circuit design 410 of FIG. 4) relative to a selector signal of the portion of the circuit design.

As shown in FIG. 6, the report 600 may include a signal identifier portion 610. In some embodiments, the signal identifier section 610 may identify a signal that is selected as a selector signal (or multiple signals selected as the selector signal) and an internal signal. For example, the signal identifier section 610 may include the signal name of an internal signal and the signal name of the selector signal. The signal identifier portion 610 may also identify a time interval (e.g., a minimum and maximum delay from the input of the plaintext). Furthermore, the report 600 may include an observed transition counts section 620. In some embodiments, the observed transition counts section 620 may include a number of times that a specific internal signal had a transition and did not transition when the selector signal was at a first value and a number of times that the specific internal signal had a transition and did not transition when the selector signal was at a second value during a simulation of a circuit design. The expected transition counts section 630 may include a number of times that the specific internal signal would be expected to have a transition or not have a transition when the selector signal was at the first value and a number of times that the same specific internal signal would be expected to have a transition or not have a transition when the selector signal was at a second value. Furthermore, the report 600 may include a chi-squared section 640 that includes a chi-squared value for the internal signal.

Figure 7:
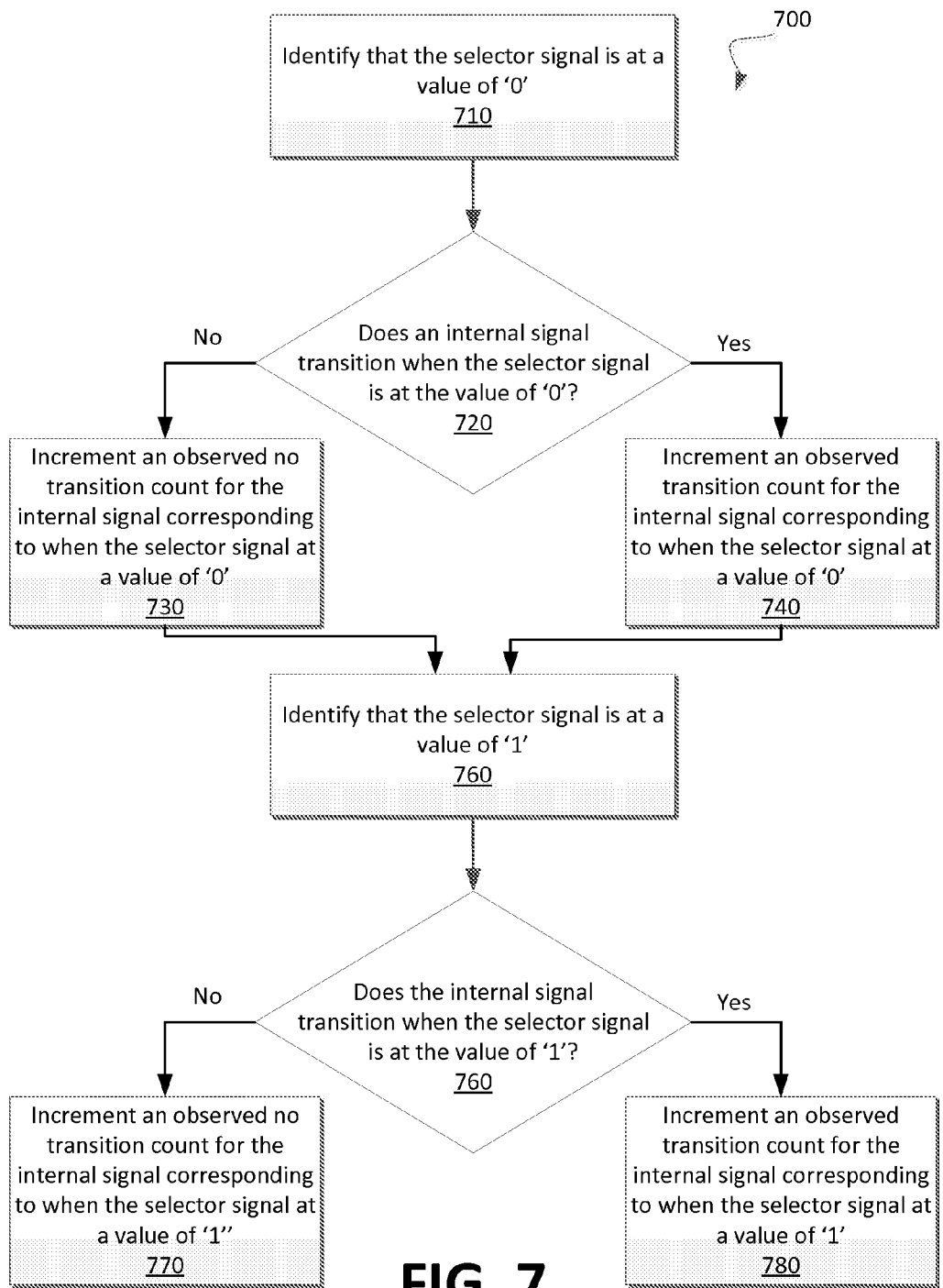
FIG. 7 is a flow diagram of an example method to record a number of transitions of a signal of a circuit in accordance with some embodiments.

FIG. 7 is a flow diagram of a method 700 to record a number of signal transitions of a circuit. In general, the method 700 may record a number of times that an internal signal of the circuit undergoes a transition and a number of times that the same internal signal does not undergo a transition relative to a first value and a second value of a selector signal of the circuit. The method 700 may be performed by processing logic that may comprise hardware (e.g., processing device, circuitry, dedicated logic, programmable logic, microcode, hardware of a device, etc.), software (e.g., instructions run or executed on a processing device), or a combination thereof. In some embodiments, the method 700 may be performed by the DPA resistance analyzer 120 of FIG. 1 or the DPA resistance analyzer 300 of FIG. 3.

As shown in FIG. 7, the method 700 may begin with the processing logic identifying that the selector signal is at a first value of '0.' (block 710). For example, the processing logic may identify that the selector signal is at a value of '0' at a first time point within a time period associated with a simulation of a circuit design. The processing logic may further determine if a particular internal signal of the circuit design transitioned when the selector signal is at the first value of '0' at the first time point within the time period (block 720). If the internal signal did transition (e.g., a rising transition, a falling transition, or either of a rising transition or a falling transition) at the first time point, then an observed transition count for the internal signal corresponding to when the selector signal is at a value of '0' may be incremented (block 740). However, if the internal signal did not transition at the first time point, then an observed no transition count for the internal signal corresponding to when the selector signal is at the value of '0' may be incremented (block 730).

The processing logic may subsequently identify that the selector signal is at a second value of '1.' (block 760). For example, the processing logic may identify that the selector signal is at a second value of '1' at a second time point within the time period associated with the simulation of the circuit design. The processing logic may further determine if the same particular internal signal of the circuit design transitioned when the selector signal is at the second value of '1' at the second time point within the time period (block 760). If the internal signal did transition (e.g., a rising transition, a falling transition, or either of a rising transition or a falling transition) at the second time point, then an observed transition count for the internal signal corresponding to when the selector signal is at the second value of '1' may be incremented (block 780). However, if the internal signal did not transition at the second time point, then an observed no transition count for the internal signal corresponding to when the selector signal is at the second value of '1' may be incremented (block 770).

Thus, a first observed transition count for an internal signal may be incremented based on time points within a time period when the selector signal is at a first value and when the internal signal undergoes a transition. A second observed transition count for the internal signal may be incremented based on time points within the time period when the selector signal is at a second value and when the internal signal undergoes a transition. A first no transition count for the same internal signal may be incremented based on time points within the same time period when the selector signal is at the first value and when the internal signal does not undergo a transition. Furthermore, a second no transition count for the same internal signal may be incremented based on time points within the same time period when the selector signal is at the second value and when the internal signal does not undergo a transition. As previously described, the observed transition counts may be based on a particular type of transition occurring. For example, in alternative embodiments, an observed transition count may be incremented when the internal signal undergoes a rising transition and not when the internal signal undergoes a falling transition. In another embodiment, the observed transition count may be incremented when the internal signal undergoes a falling transition and not when the internal signal undergoes a falling transition. Alternatively, the observed transition count may be incremented when the internal signal undergoes either one of a rising transition or a falling transition.

Figure 8:
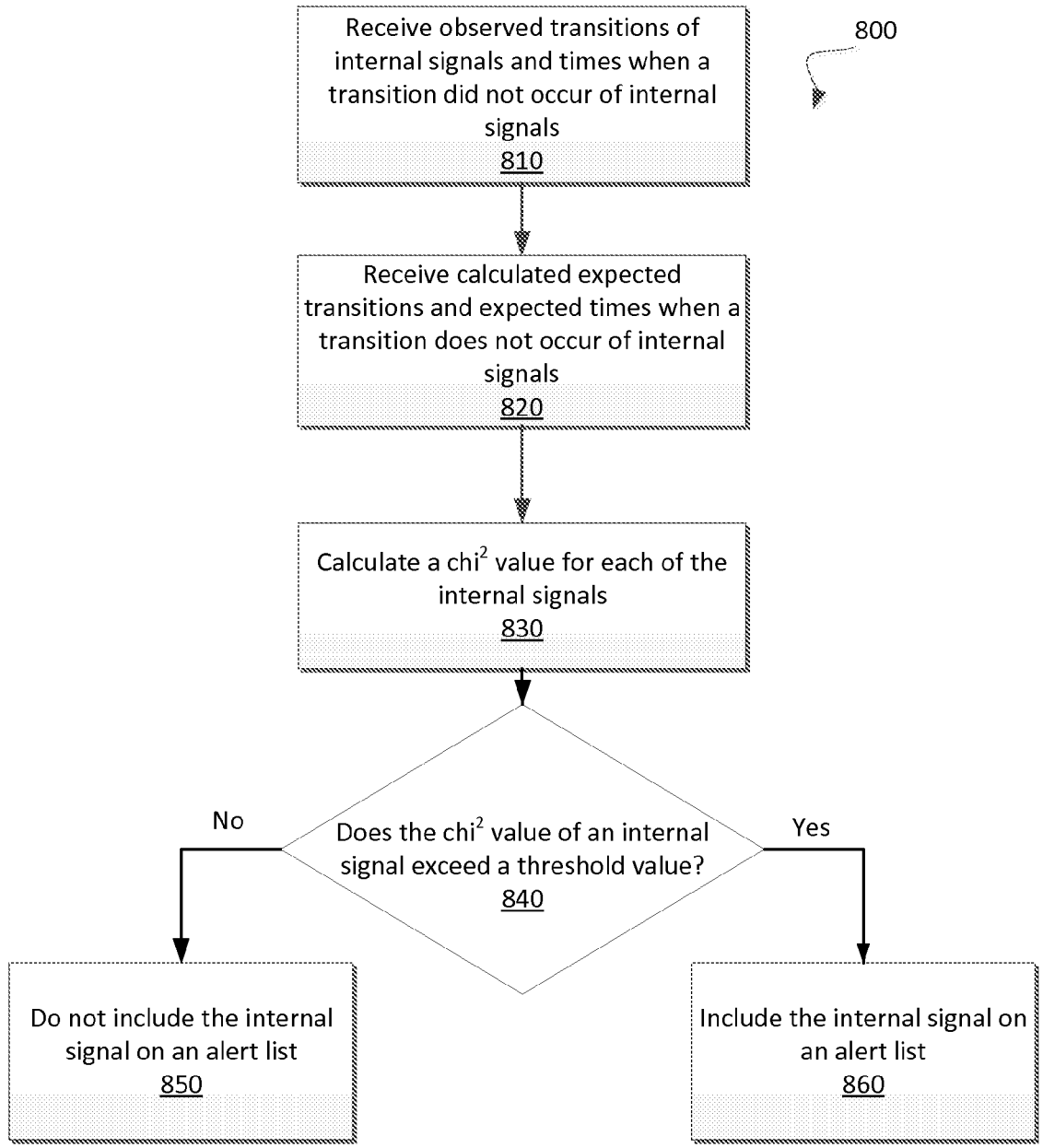
FIG. 8 is a flow diagram of an example method to identify a signal of a circuit to be included in a report in accordance with some embodiments.

FIG. 8 is a flow diagram of a method 800 to identify a signal of a circuit design to be included in a report. In general, the method 800 may identify an internal signal of a circuit design that is associated with a high chi-squared value that may indicate a high degree of dependence between the internal signal and a selector signal. The method 800 may be performed by processing logic that may comprise hardware (e.g., processing device, circuitry, dedicated logic, programmable logic, microcode, hardware of a device, etc.), software (e.g., instructions run or executed on a processing device), or a combination thereof. In some embodiments, the method 800 may be performed by the DPA resistance analyzer 120 of FIG. 1 or the DPA resistance analyzer 300 of FIG. 3.

As shown in FIG. 8, the method 800 may begin with the processing logic receiving observed transitions of internal signals and observed times when the internal signals did not transition (block 810). For example, the processing logic may receive a number of times that an internal signal has transitioned or did not transition at time points during a time period when a selector value was at a first value and when the selector value was at a second value. Furthermore, the processing logic may receive calculated expected transitions and expected times when a transition does not occur (e.g., a no transition) of the internal signals (block 820). The processing logic may calculate a chi-squared value for each of the internal signals (block 830). In some embodiments, the chi-squared value may be calculated based on the observed transitions and observed times when a transition does not occur of an internal signal and the calculated expected transitions and expected times when a transition does not occur of the internal signals. The processing logic may determine if the chi-squared value of an internal signal exceeds a threshold value (block 840). In some embodiments, if the chi-squared value of the internal signal exceeds the threshold value then the internal signal may be considered to be leaky and excessively dependent upon the selector signal and thus may be considered to be susceptible to a DPA attack (e.g., the internal signal is a source of a DPA leak). However, if the chi-squared value of the internal signal does not exceed the threshold value then the internal signal may not be considered to be leaky and may be considered to be sufficiently independent of the selector signal. Thus, if the chi-squared value of the internal signal does exceed the threshold value then the internal signal may be included on an alert list of a report from the DPA resistance analysis of the circuit design (block 860). However, if the chi-squared value of the internal signal does not exceed the threshold value then the internal signal may not be included on the alert list of the report from the DPA resistance analysis of the circuit design (block 850).

Figure 9:
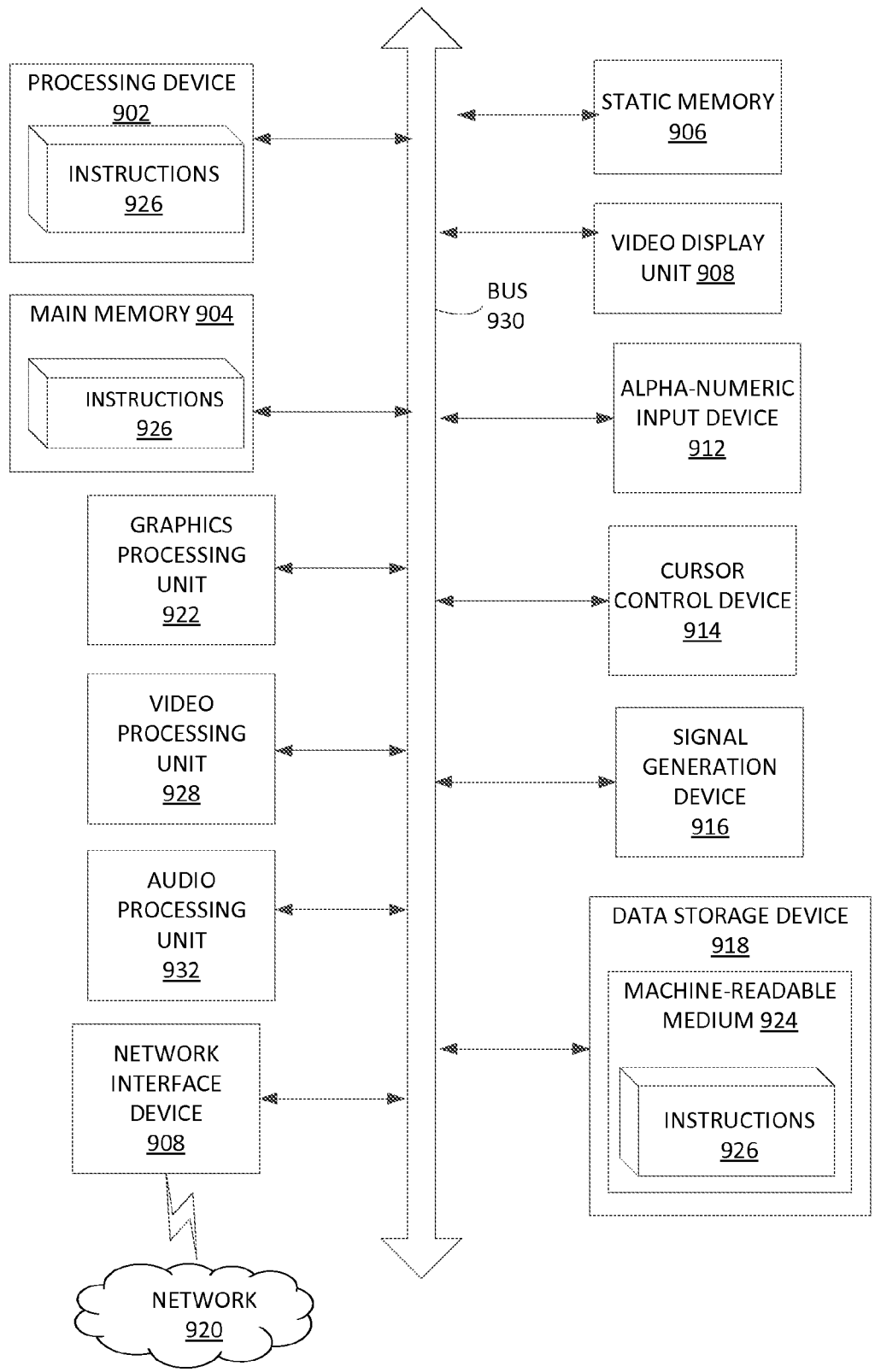
FIG. 9 illustrates a block diagram of an embodiment of a computer system in which some embodiments of the disclosure may operate.

FIG. 9 illustrates an example machine of a computer system 900 within which a set of instructions, for causing the machine to perform any one or more of the methodologies discussed herein, may be executed. In alternative implementations, the machine may be connected (e.g., networked) to other machines in a LAN, an intranet, an extranet, and/or the Internet. The machine may operate in the capacity of a server or a client machine in client-server network environment, as a peer machine in a peer-to-peer (or distributed) network environment, or as a server or a client machine in a cloud computing infrastructure or environment.

The machine may be a personal computer (PC), a tablet PC, a set-top box (STB), a Personal Digital Assistant (PDA), a cellular telephone, a web appliance, a server, a network router, a switch or bridge, or any machine capable of executing a set of instructions (sequential or otherwise) that specify actions to be taken by that machine. Further, while a single machine is illustrated, the term "machine" shall also be taken to include any collection of machines that individually or jointly execute a set (or multiple sets) of instructions to perform any one or more of the methodologies discussed herein.

The example computer system 900 includes a processing device 902, a main memory 904 (e.g., read-only memory (ROM), flash memory, dynamic random access memory (DRAM) such as synchronous DRAM (SDRAM) or Rambus DRAM (RDRAM), etc., a static memory 906 (e.g., flash memory, static random access memory (SRAM), etc.), and a data storage device 918, which communicate with each other via a bus 930.

Processing device 902 represents one or more general-purpose processing devices such as a microprocessor, a central processing unit, or the like. More particularly, the processing device may be complex instruction set computing (CISC) microprocessor, reduced instruction set computing (RISC) microprocessor, very long instruction word (VLIW) microprocessor, or processor implementing other instruction sets, or processors implementing a combination of instruction sets. Processing device 902 may also be one or more special-purpose processing devices such as an application specific integrated circuit (ASIC), a field programmable gate array (FPGA), a digital signal processor (DSP), network processor, or the like. The processing device 902 is configured to execute instructions 926 for performing the operations and steps discussed herein.

The computer system 900 may further include a network interface device 908. The computer system 900 also may include a video display unit 910 (e.g., a liquid crystal display (LCD) or a cathode ray tube (CRT)), an alphanumeric input device 912 (e.g., a keyboard), a cursor control device 914 (e.g., a mouse), a graphics processing unit 922, and a signal generation device 916 (e.g., a speaker).

The data storage device 918 may include a machine-readable storage medium 928 (also known as a computer-readable medium) on which is stored one or more sets of instructions or software 926 embodying any one or more of the methodologies or functions described herein. The instructions 926 may also reside, completely or at least partially, within the main memory 904 and/or within the processing device 902 during execution thereof by the computer system 900, the main memory 904 and the processing device 902 also constituting machine-readable storage media.

In one implementation, the instructions 926 include instructions to implement functionality corresponding to a DPA resistance analyzer (e.g., a DPA resistance analyzer 120 of FIG. 1 or a DPA resistance analyzer 300 of FIG. 3). While the machine-readable storage medium 928 is shown in an example implementation to be a single medium, the term "machine-readable storage medium" should be taken to include a single medium or multiple media (e.g., a centralized or distributed database, and/or associated caches and servers) that store the one or more sets of instructions. The term "machine-readable storage medium" shall also be taken to include any medium that is capable of storing or encoding a set of instructions for execution by the machine and that cause the machine to perform any one or more of the methodologies of the present disclosure. The term "machine-readable storage medium" shall accordingly be taken to include, but not be limited to, solid-state memories, optical media and magnetic media.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as "identifying" or "determining" or "executing" or "performing" or "collecting" or "creating" or "sending" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage devices.

The present disclosure also relates to an apparatus for performing the operations herein. This apparatus may be specially constructed for the intended purposes, or it may comprise a general purpose computer selectively activated or reconfigured by a computer program stored in the computer. Such a computer program may be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, each coupled to a computer system bus.

The algorithms and displays presented herein are not inherently related to any particular computer or other apparatus. Various general purpose systems may be used with programs in accordance with the teachings herein, or it may prove convenient to construct a more specialized apparatus to perform the method. The structure for a variety of these systems will appear as set forth in the description below. In addition, the present disclosure is not described with reference to any particular programming language. It will be appreciated that a variety of programming languages may be used to implement the teachings of the disclosure as described herein.

The present disclosure may be provided as a computer program product, or software, that may include a machine-readable medium having stored thereon instructions, which may be used to program a computer system (or other electronic devices) to perform a process according to the present disclosure. A machine-readable medium includes any mechanism for storing information in a form readable by a machine (e.g., a computer). For example, a machine-readable (e.g., computer-readable) medium includes a machine (e.g., a computer) readable storage medium such as a read only memory ("ROM"), random access memory ("RAM"), magnetic disk storage media, optical storage media, flash memory devices, etc.

In the foregoing specification, implementations of the disclosure have been described with reference to specific example implementations thereof. It will be evident that various modifications may be made thereto without departing from the broader spirit and scope of implementations of the disclosure as set forth in the following claims. The specification and drawings are, accordingly, to be regarded in an illustrative sense rather than a restrictive sense.

What is claimed is:

1. A method comprising:
   identifying a selector signal associated with a circuit;
   identifying an internal signal associated with the circuit;
   calculating a number of times that the internal signal is associated with a transition and a number of times that the internal signal is not associated with a transition when the selector signal is at a first value;
   calculating a number of times that the internal signal is associated with a transition and a number of times that the internal signal is not associated with a transition when the selector signal is at a second value; and
   determining, by a processing device, a value corresponding to a dependence between the internal signal and the selector signal based on the calculations.

2. The method of claim 1, further comprising:
   calculating an expected number of times that the internal signal is associated with the transition and an expected number of times that the internal signal is not associated with the transition when the selector signal is at the first value; and calculating an expected number of times that the internal signal is associated with the transition and an expected number of times that the internal signal is not associated with the transition when the selector signal is at the second value.

3. The method of claim 2, wherein the value corresponding to the dependence between the internal signal and the selector signal is further based on the expected number of times that the internal signal is associated with the transition when the selector signal is at the first value and the expected number of times that the internal signal is not associated with the transition when the selector signal is at the second value.

4. The method of claim 1, wherein the value corresponding to the dependence between the internal signal and the selector signal is based on a chi-squared distribution.

5. The method of claim 1, further comprising:
determining if the value corresponding to the dependence between the internal signal and the selector signal exceeds a threshold value; and
if the value corresponding to the dependence between the internal signal and the selector signal exceeds the threshold value, identifying the internal signal as a potential differential power analysis (DPA) leak.

6. The method of claim 1, wherein the selector signal is an input to the circuit and the internal signal is a signal corresponding to a cryptographic operation associated with the circuit.

7. The method of claim 1, wherein the transition comprises a change in the internal signal from a first state to a second state.

8. A system comprising:
a memory; and
a processing device coupled with the memory to:
identify a first signal;
identify a second signal;
determine a first count corresponding to a number of times that the second signal is associated with a transition when the first signal is at a first value;
determine a second count corresponding to a number of times that the second signal is associated with a transition when the first signal is at a second value; and
calculate a value corresponding to a dependence between the second signal and the first signal based on the first count and the second count.

9. The system of claim 8, wherein the processing device is further to:
determine a third count corresponding to a number of times that the second signal is not associated with a transition when the first signal is at the first value; and
determine a fourth count corresponding to a number of times that the second signal is not associated with a transition when the first signal is at the second value.

10. The system of claim 9, wherein the value corresponding to the dependence between the second signal and the first signal is further based on the third count and the fourth count.

11. The system of claim 8, wherein the processing device is further to:
calculate a first expected count corresponding to an expected number of times that the second signal should be associated with a transition when the first signal is at the first value based on an expected distribution; and
calculate a second expected count corresponding to an expected number of times that the second signal should be associated with a transition when the first signal is at the second value based on the expected distribution.

12. The system of claim 11, wherein the expected distribution is a chi-squared distribution.

13. The system of claim 8, wherein the processing device is further to:
receive a circuit design; and
identify a portion of the circuit design that corresponds to a cryptographic operation, wherein the first signal and the second signal are associated with the portion of the circuit design.

14. The system of claim 8, wherein the processing device is further to:
determine if the value corresponding to the dependence between the second signal and the first signal meets or exceeds a threshold value; and
if the value corresponding to the dependence between the second signal and the first signal meets or exceeds the threshold value, generating a report identifying the second signal as a potential differential power analysis (DPA) leak.

15. A non-transitory computer readable medium including data that, when accessed by a processing device, cause the processing device to perform operations comprising:
identifying a first signal and a second signal associated with a circuit;
determining a first count of a number of times that the second signal is associated with a transition when the first signal is at a first value;
determining a second count of a number of times that the second signal is associated with a transition when the first signal is at a second value; and
calculating, by a processing device, a value corresponding to a dependence between the second signal and the first signal based on the first count and the second count.

16. The non-transitory computer readable medium of claim 15, the operations further comprising:
calculating a first expected count corresponding to an expected number of times that the second signal should be associated with a transition when the first signal is at the first value based on an expected distribution; and
calculating a second expected count corresponding to an expected number of times that the second signal should be associated with a transition when the first signal is at the second value based on the expected distribution.

17. The non-transitory computer readable medium of claim 16, wherein the expected distribution is a chi-squared distribution based on the transitions of the first signal and the values of the second signal.

18. The non-transitory computer readable medium of claim 15, the operations further comprising:
determining if the value corresponding to the dependence between the second signal and the first signal meets or exceeds a threshold value; and
if the value corresponding to the dependence between the second signal and the first signal meets or exceeds the threshold value, identifying the second signal as a potential differential power analysis (DPA) leak.

19. The non-transitory computer readable medium of claim 18, the operations further comprising:
generating a report of the second signal, wherein the report identifies observed counts of the transitions of the second signal associated with the first and second values of the first signal, and wherein the report identifies if the second signal is a potential DPA leak.

20. The non-transitory computer readable medium of claim 15, the operations further comprising:
    identifying a circuit; and
    identify a portion of the circuit that corresponds to a cryptographic operation, wherein the first signal and the second signal are associated with the portion of the circuit that corresponds to the cryptographic operation.

\* \* \* \* \*